United States Patent
Sterling et al.

(10) Patent No.: US 10,494,079 B2
(45) Date of Patent: Dec. 3, 2019

(54) DECOMPRESSION PANEL ASSEMBLY AND METHODS OF MANUFACTURING THE SAME

(71) Applicant: The Boeing Company, Chicago, IL (US)

(72) Inventors: David E. Sterling, Seattle, WA (US); James Scott Griffing, Mountlake Terrace, WA (US); Thomas Seth Perkins, Renton, WA (US); Hannah Katherine Beck, Seattle, WA (US); Adam Robert Weston, Brier, WA (US); Sara Lynn Walter, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 817 days.

(21) Appl. No.: 15/085,411

(22) Filed: Mar. 30, 2016

(65) Prior Publication Data

US 2017/0283029 A1    Oct. 5, 2017

(51) Int. Cl.
*B64C 1/18* (2006.01)
*B64F 5/10* (2017.01)
*B64C 1/00* (2006.01)

(52) U.S. Cl.
CPC ............ *B64C 1/18* (2013.01); *B64F 5/10* (2017.01); *B64C 2001/009* (2013.01)

(58) Field of Classification Search
CPC ............................. B64C 2001/009; B64C 1/18
See application file for complete search history.

(56) References Cited

U.S. PATENT DOCUMENTS

| | | | |
|---|---|---|---|
| 3,571,977 A | 3/1971 | Abeel | |
| 5,085,017 A | 2/1992 | Hararat-Tehrani | |
| 5,118,053 A | 6/1992 | Singh et al. | |
| 5,137,231 A * | 8/1992 | Boss | B64C 1/18 244/118.5 |
| 6,029,933 A * | 2/2000 | Holman | B64C 1/10 244/118.5 |
| 6,129,312 A * | 10/2000 | Weber | B64C 1/18 244/118.5 |
| 6,264,141 B1 | 7/2001 | Shim et al. | |
| 7,578,477 B2 * | 8/2009 | French | B64C 1/1469 244/117 R |
| 8,201,775 B2 * | 6/2012 | Treimer | B64C 1/18 165/235 |
| 8,393,577 B2 | 3/2013 | Roth et al. | |
| 8,567,721 B2 | 10/2013 | Voss et al. | |
| 8,651,924 B1 * | 2/2014 | Jones | B64D 13/02 244/118.5 |
| 8,955,803 B2 | 2/2015 | Voss et al. | |
| 9,566,759 B2 * | 2/2017 | Perkins | B64C 1/18 |
| 2018/0127100 A1 * | 5/2018 | Roth | B64C 1/18 |

* cited by examiner

*Primary Examiner* — Philip J Bonzell
*Assistant Examiner* — Michael B. Kreiner
(74) *Attorney, Agent, or Firm* — Armstrong Teasdale LLP

(57) ABSTRACT

A decompression panel assembly for use in an aircraft includes a body portion comprising a plurality of frame members defining a plurality of openings in the body portion. The decompression panel assembly also includes a baffle member integrally formed with the plurality of frame members such that the baffle member removably obstructs at least one opening of the plurality of openings. The baffle member is configured for at least partial displacement from the at least one opening during a decompression event.

20 Claims, 8 Drawing Sheets

DECOMPRESSION PANEL ASSEMBLY AND METHODS OF MANUFACTURING THE SAME

BACKGROUND

The field of the present disclosure relates generally to aircraft assemblies and, more specifically, to sidewall panel assemblies for use in aircraft assemblies.

During a pressure change on an aircraft (such as a decompression event), air may flow from a passenger cabin to a cargo bay below the cabin through a cabin sidewall. Accordingly, the cabin sidewalls include decompression panels or decompression grills that restrict such airflow in standard operation and enable the airflow during a decompression event. At least some known decompression panels include a grill of louvers that define a plurality of openings through the grill. These openings allow air to flow through the grill during both normal operation and during a decompression event. A separate baffle member is coupled to the backside of the grill opening(s) to limit the amount of return air flow and to decrease the noise in the cabin during normal operation. However, in order to reduce the noise level during normal operation, at least some known baffle members are formed from a relatively thick and heavy material. The baffle is releasably coupled to the grill and releases from the grill during a decompression event. Additionally, because the baffle is a separate component, some type of mechanical fastener or adhesive affixes the baffle to the grill. The size of the baffle and the associated fastening means both add weight to the aircraft. Furthermore, because the baffle is only connected to the grill in discrete locations, the baffle may vibrate where not affixed to the grill and transmit additional undesired noise to the cabin during normal operations.

BRIEF DESCRIPTION

In one aspect, a decompression panel assembly for use in an aircraft is provided. The decompression panel assembly includes a body portion comprising a plurality of frame members defining a plurality of openings in the body portion. The decompression panel assembly also includes a baffle member integrally formed with the plurality of frame members such that the baffle member removably obstructs at least one opening of the plurality of openings. The baffle member is configured for at least partial displacement from the at least one opening during a decompression event.

In another aspect, a method of manufacturing a decompression panel assembly for use in an aircraft is provided. The method includes integrally forming a body portion with a plurality of frame members such that the plurality of frame members define a plurality of openings in the body portion. The method also includes integrally forming a baffle member with the body portion and the plurality of frame members such that the baffle member removably obstructs at least one opening of the plurality of openings. The baffle member is configured for at least partial displacement from the at least one opening during a decompression event.

In yet another aspect, a method of installing a decompression panel assembly in an aircraft is provided. The decompression panel assembly includes a body portion, a baffle member, and a panel member. The method includes coupling the body portion to the panel member, wherein the body portion includes a plurality of frame members defining a plurality of openings in the body portion. The method also includes coupling the baffle member to the plurality of frame members such that the baffle member removably obstructs at least one opening of the plurality of openings. The baffle member is integrally formed with the plurality of frame members and is configured for at least partial displacement from the at least one opening during a decompression event. The panel member is then coupled between a sidewall and a floor panel.

DETAILED DESCRIPTION

The embodiments described herein facilitate integrally forming a single-piece decompression panel assembly. The decompression panel assembly includes a body portion having frame members that define a plurality of openings and a baffle member integrally formed with the frame members such that the baffle member removably obstructs the openings. The baffle member also includes lines of weakness or frangible seams that yield during a decompression event such that the baffle member breaks away from the frame members, either as a single piece or as a plurality of detachable sections, to enable air to flow from the aircraft cabin through the openings in the decompression panel assembly.

As described herein, the integrally formed baffle member has a number of advantages over conventional separate baffles that are attached to a decompression panel with fasteners or adhesive. For example, the integrally formed baffle member described herein may result in less noise transmission in the cabin because the baffle is a solid member that is continuously attached to the frame members. As such, the integral baffle may not allow for any undesired air to pass through or for flapping or resonating, which are known to generate undesirable noise in the cabin. Similarly, the integral baffle member described herein can facilitate reducing the weight of the decompression panel assembly. In order to reduce the movement described above, some conventional baffles are relatively heavy. The integral baffle member described herein is a unitary piece with the remainder of the decompression panel assembly and is formed from the same lightweight material such that additional materials to reduce noise transmission are not required. Finally, the integral decompression panel and baffle described herein can simplify manufacturing and installation of the decompression panel assembly, which facilitates reducing costs.

Figure 1:
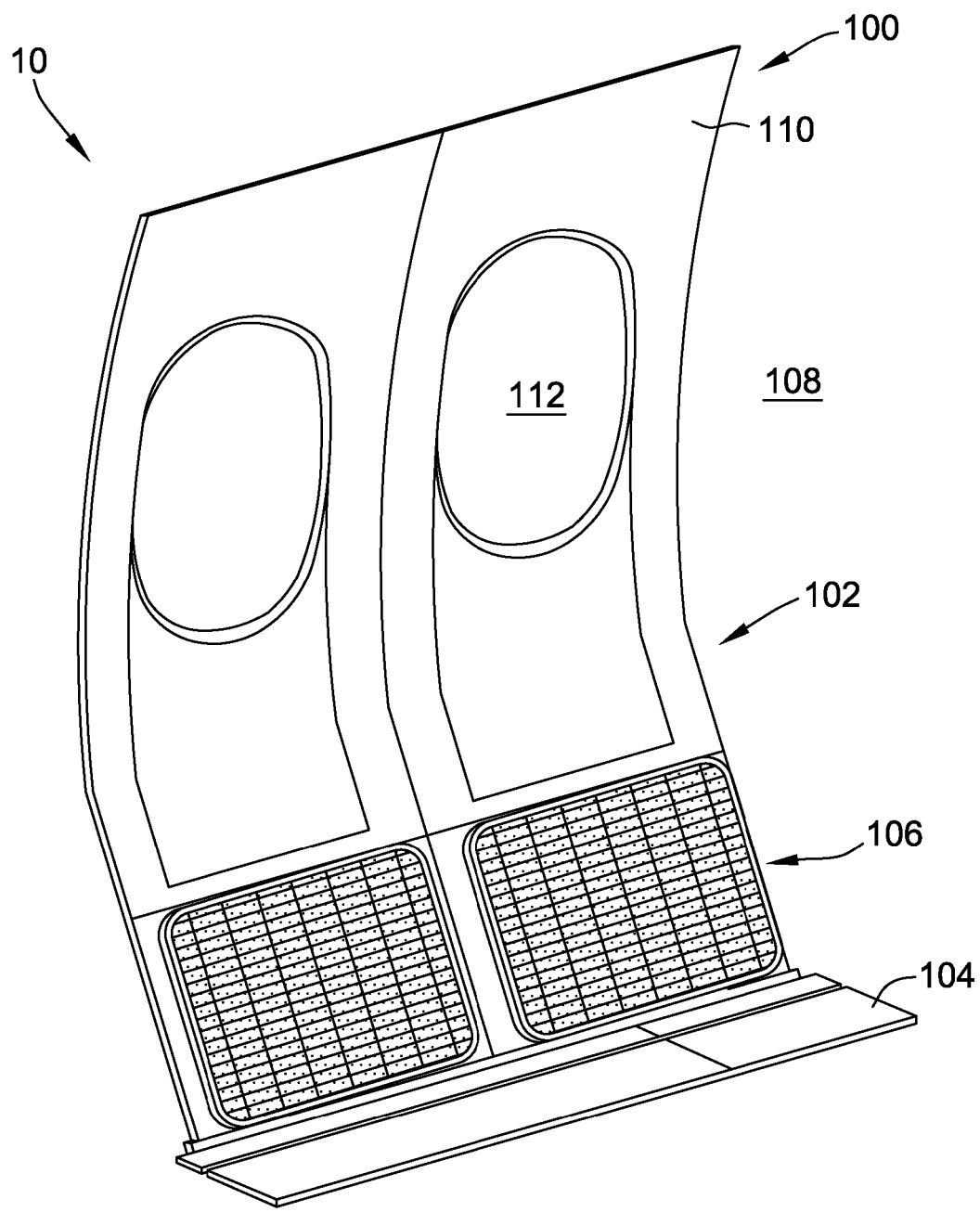
FIG. 1 is a perspective view of an inboard configuration of an exemplary aircraft cabin.

Referring to the drawings, FIG. 1 is a perspective sectional view of an exemplary cabin 100 that may be used with an aircraft 10. In the exemplary implementation, aircraft cabin 100 includes a sidewall assembly 102, a floor panel 104, and a decompression panel assembly 106 coupled therebetween. Sidewall assembly 102, floor panel 104, and decompression panel assembly 106 at least partially define an interior 108 of aircraft cabin 100. Sidewall assembly 102 includes a sidewall 110 having a window opening 112 defined therein. Alternatively, sidewall 110 does not include window opening 112. In operation, decompression panel assembly 106 facilitates circulating conditioned air through aircraft cabin 100 and/or facilitate equalizing the pressure in aircraft cabin 100 during a decompression event.

Figure 2:
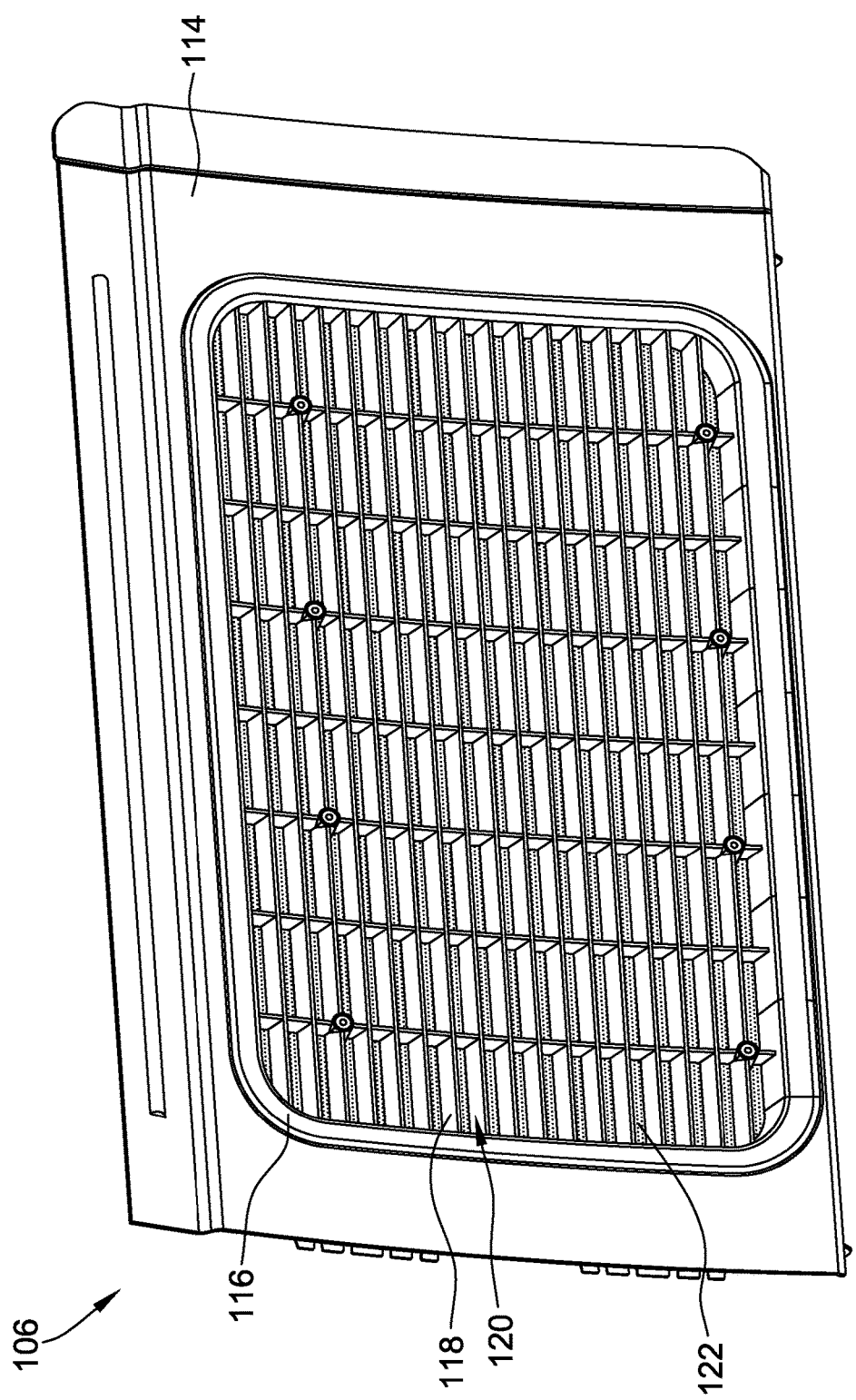
FIG. 2 is a perspective view of an inboard configuration of an exemplary decompression panel assembly that may be used in the aircraft cabin shown in FIG. 1.
Figure 3:
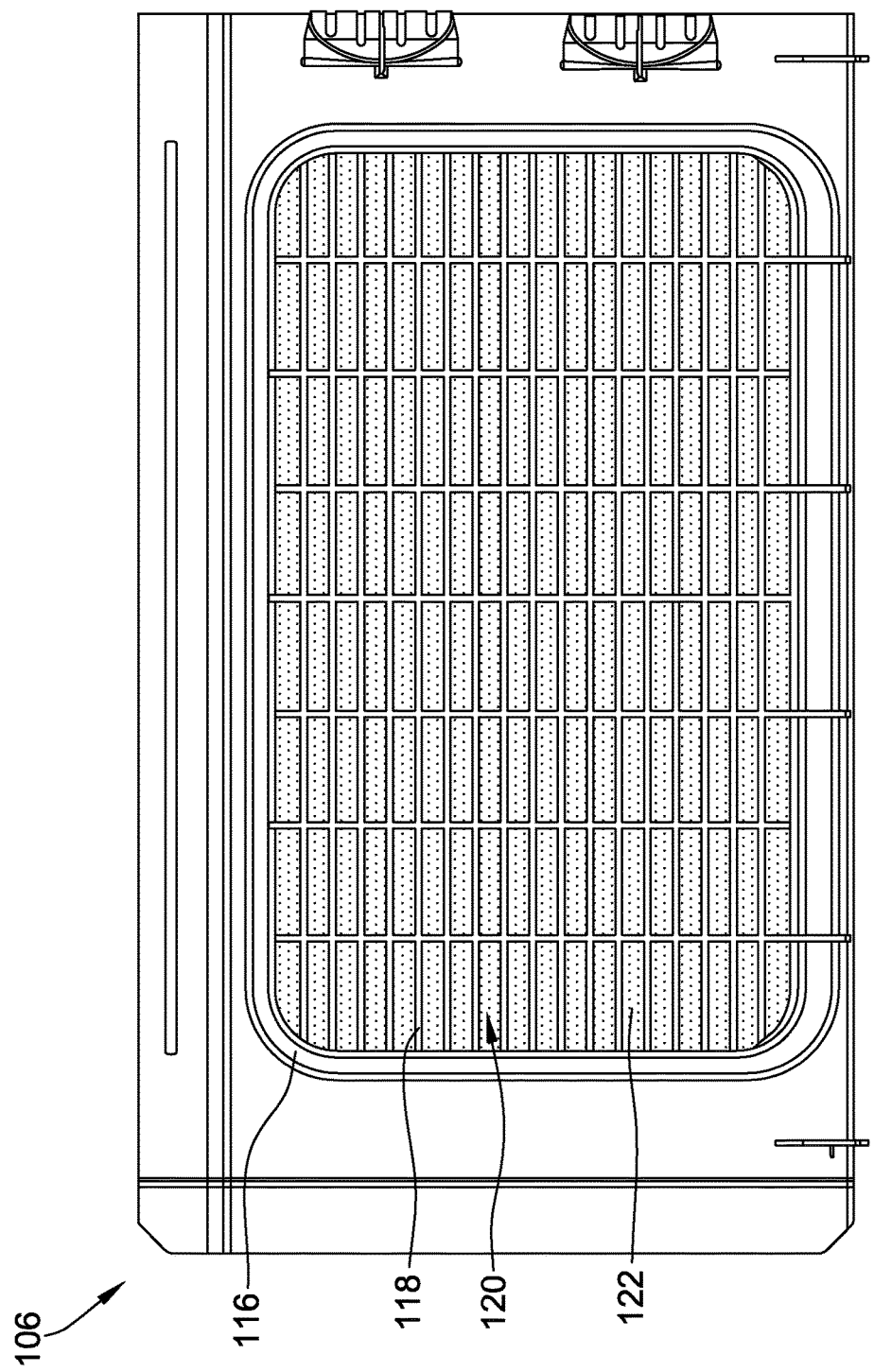
FIG. 3 is a perspective view of an outboard configuration of the decompression panel assembly shown in FIG. 2.

FIG. 2 is a perspective view of an inboard configuration of decompression panel assembly 106, and FIG. 3 is a perspective view of an outboard configuration of decompression panel assembly 106. In the exemplary implementation, decompression panel assembly 106 includes a panel member 114 coupled between sidewall 110 (shown in FIG. 1) and floor panel 104 (shown in FIG. 1). Decompression panel assembly 106 also includes a body portion 116 including a plurality of frame members 118 that define a plurality of openings 120 in body portion 116. Frame members 118 are also referred to herein as a plurality of louvers or collectively as a grill. In the exemplary implementation, panel member 114, body portion 116, and frame members 118 are integrally formed together. In another implementation, body portion 116 and frame members 118 are integrally formed together and then coupled within an opening in panel member 114.

Figure 4:
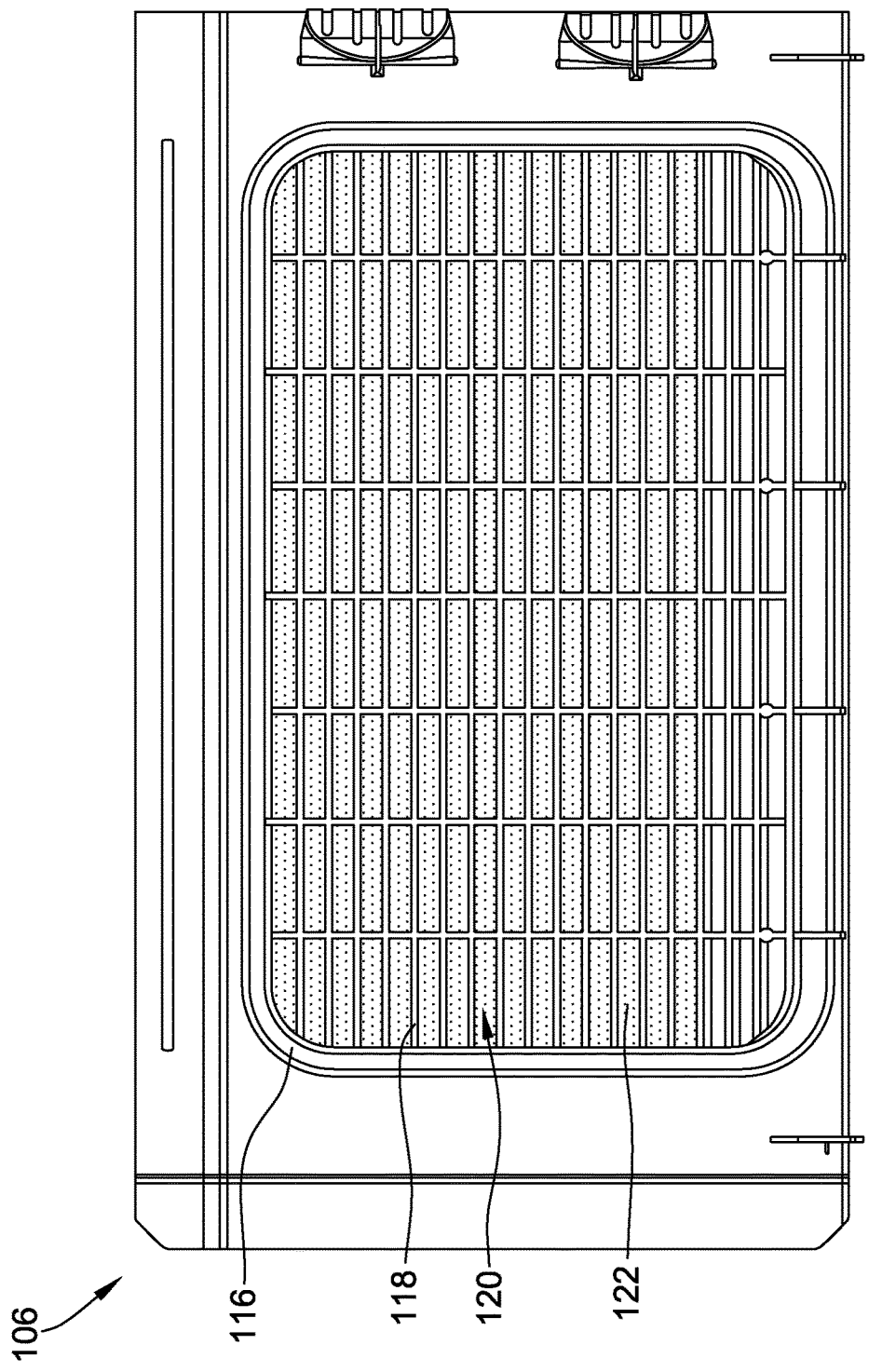
FIG. 4 is a perspective view of an outboard configuration of an alternative decompression panel assembly that may be used in the aircraft cabin shown in FIG. 1.

In the exemplary implementation, decompression panel assembly 106 also includes a baffle member 122 releasably coupled to frame members 118. More specifically, as described herein, baffle member 122 is integrally formed with frame members 118 and body portion 116 such that baffle member 122, frame members 118, and body portion 116 form a single-piece, unitary, component. Baffle member 122 is integrally formed with frame members 118 such that baffle member 122 removably obstructs the plurality of openings 120. In operation, baffle member 122 is configured for at least partial displacement from frame members 118 during a decompression event to enable air flow through openings 120. As shown in FIG. 3, baffle member 122 removably obstructs each opening of plurality of openings 120. Alternatively, as shown in FIG. 4, baffle member 122 removably obstructs a majority of, but fewer than all, of the plurality of openings 120. As such, in the configuration shown in FIG. 4 at least some air flows through decompression panel assembly 106 during standard pressurization operations. During a decompression event, air flows through the openings 120 in frame members 118 and detaches baffle member 122 from frame members 118 such that the air flows through decompression panel assembly 106 without moving frame members 118 or body portion 116 relative to remainder of decompression panel assembly 106 or moving decompression panel assembly 106 relative to sidewall 110.

Figure 5:
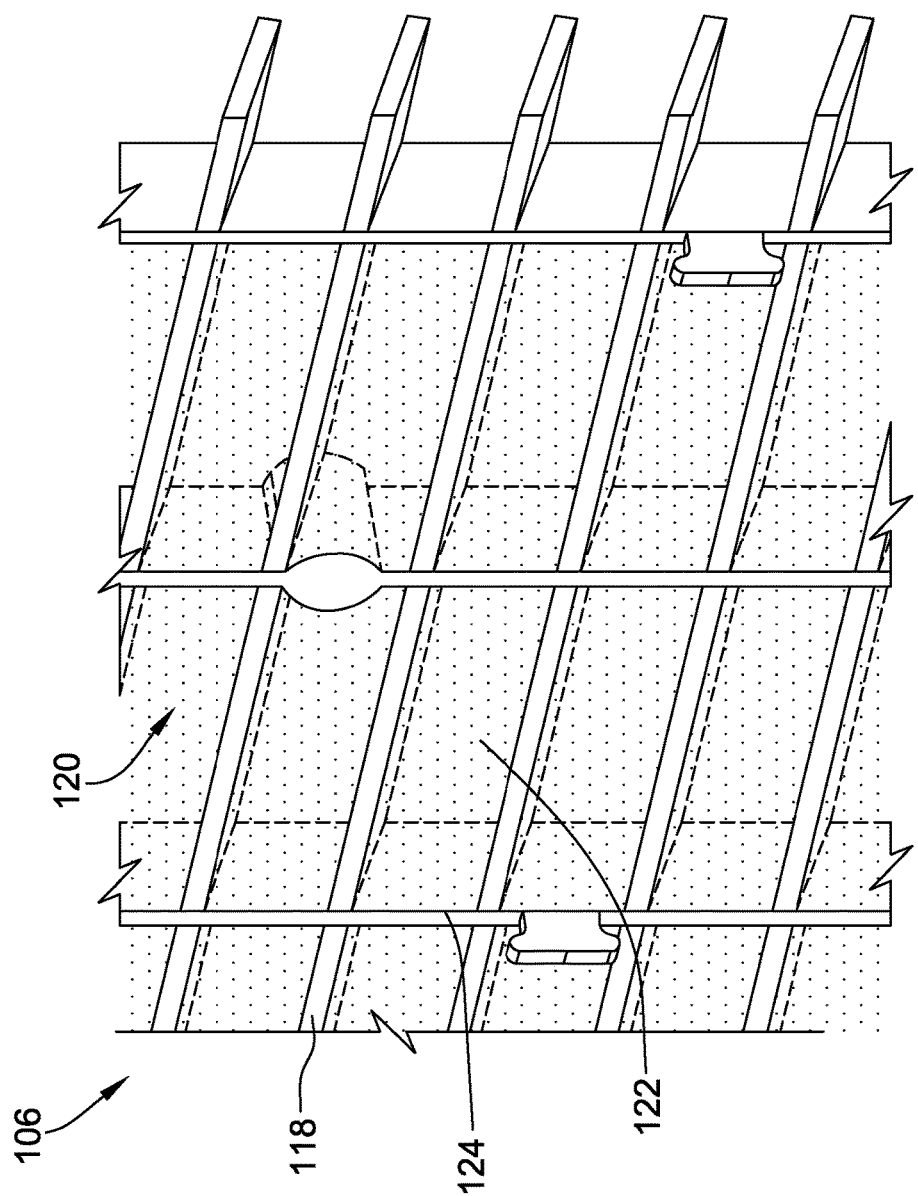
FIG. 5 is an enlarged perspective view of an exemplary grill portion and integral baffle member of the decompression panel assembly shown in FIG. 3.
Figure 6:
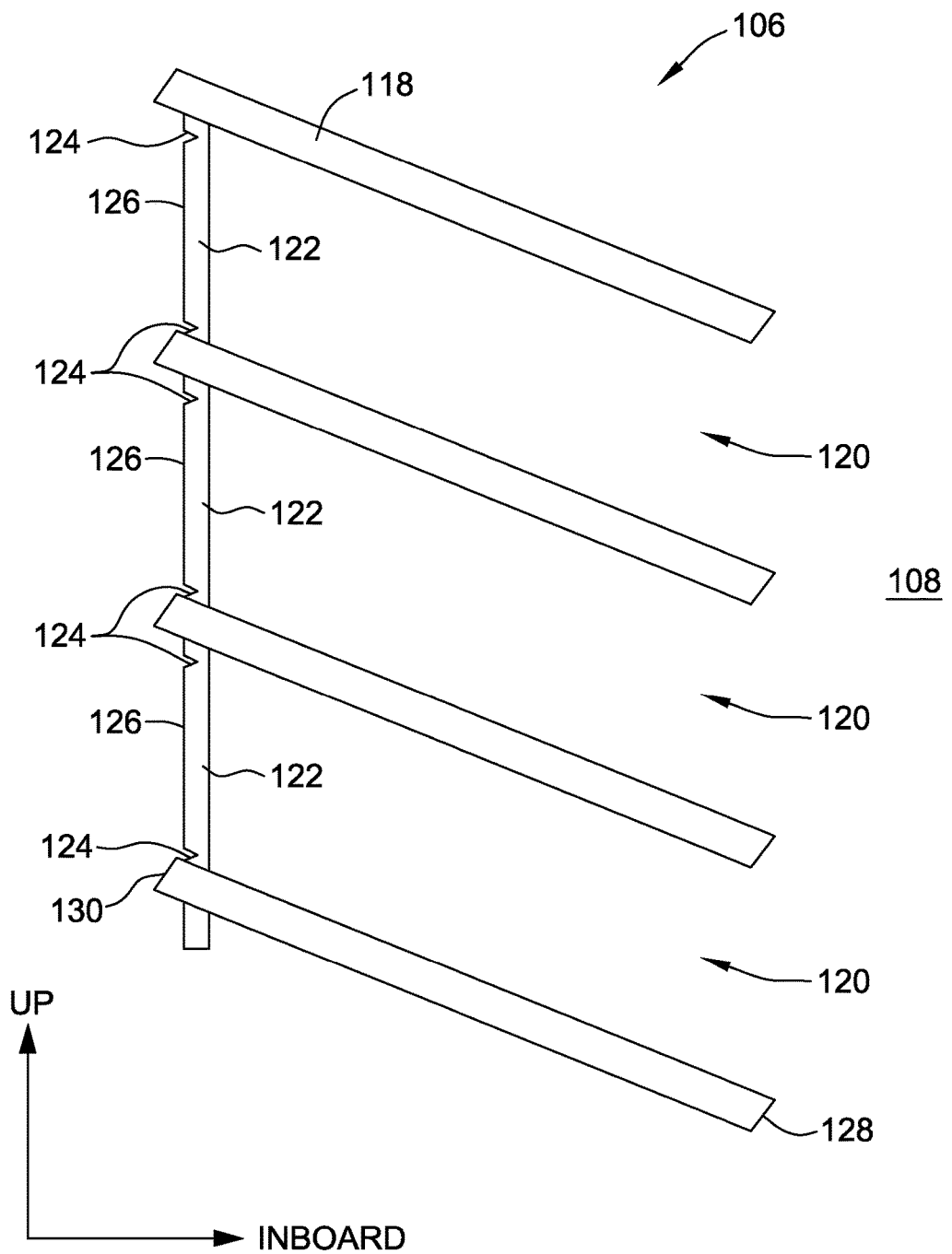
FIG. 6 is a side view of the grill portion and integral baffle member of the decompression panel assembly shown in FIG. 5.

FIG. 5 is an enlarged perspective view of a portion of decompression panel assembly 106 illustrating integral frame members 118 and baffle member 122. FIG. 6 is a side view of a portion of decompression panel assembly 106 illustrating integral frame members 118 and baffle member 122. In the exemplary embodiment, baffle member 122 includes a plurality of frangible seams 124 that yield, or fracture, during a decompression event such that the baffle member 122 detaches from frame members 118 to allow air to flow through openings 120. In operation during a decompression event, frangible seams 124 yield to the pressure differential on opposing sides thereof such that baffle member 122 is detached from frame members 118 to allow air to flow through openings 120.

In the exemplary implementation, frangible seams 124 form a plurality of detachable sections 126 in baffle member 122 that are each associated with an opening of the plurality of openings 120. In such a configuration, each detachable section 126 at least partially detaches from frame members 118 to allow air to flow through openings 120. In another implementation, frangible seams 124 are formed about an outer perimeter of baffle member 122 such that baffle member 122 detaches from frame members 118 as a single piece during a decompression event.

In one implementation, frangible seams 124 form a complete perimeter of each detachable section 126 such that each detachable section 126 is completely detached from frame members 118 during a decompression event and is carried outboard by the air flowing through openings 120. In another implementation, frangible seams 124 form only a portion of a perimeter of each detachable section 126 such that each detachable section 126 only partially detaches from frame members 118 during a decompression event. More specifically, a portion of the perimeter of each detachable section 126 includes no frangible seam 124 or more robust frangible seam 124 than the remainder of the perimeter such that each detachable section 126 pivots about the portion with no frangible seam or a more robust seam 124 and remains hingedly coupled to frame members 118 as air flows through openings 120.

As shown in FIG. 6, frame members 118 include an inboard edge 128 and an outboard edge 130. In the exemplary implementation, baffle member 122 is integrally formed with frame members 118 at or proximate outboard edge 130. As such, during a decompression event, air flowing from cabin interior 108 through openings 120 impacts detachable sections 126 of baffle member 122 and cause detachable sections 126 to at least partially separate from frame members 118. Alternatively, baffle member 122 is integrally formed with frame members 118 at or proximate inboard edge 128 such that, during a decompression event, air impacts detachable sections 126 of baffle member 122 and causes detachable sections 126 to at least partially separate from frame members 118. In configurations when frangible seams 124 form an entire perimeter of detachable sections 126, the air flow carries the separated detachable sections 126 through openings 120 and out the outboard side of decompression panel assembly 106.

Although shown as formed on the outboard side of baffle member 122 in FIG. 6, frangible seams 124 may alternatively be formed on the inboard side of baffle member 122. Furthermore, in one implementation, frangible seams 124 are formed on both the inboard and outboard sides of baffle member 122.

Figure 7:
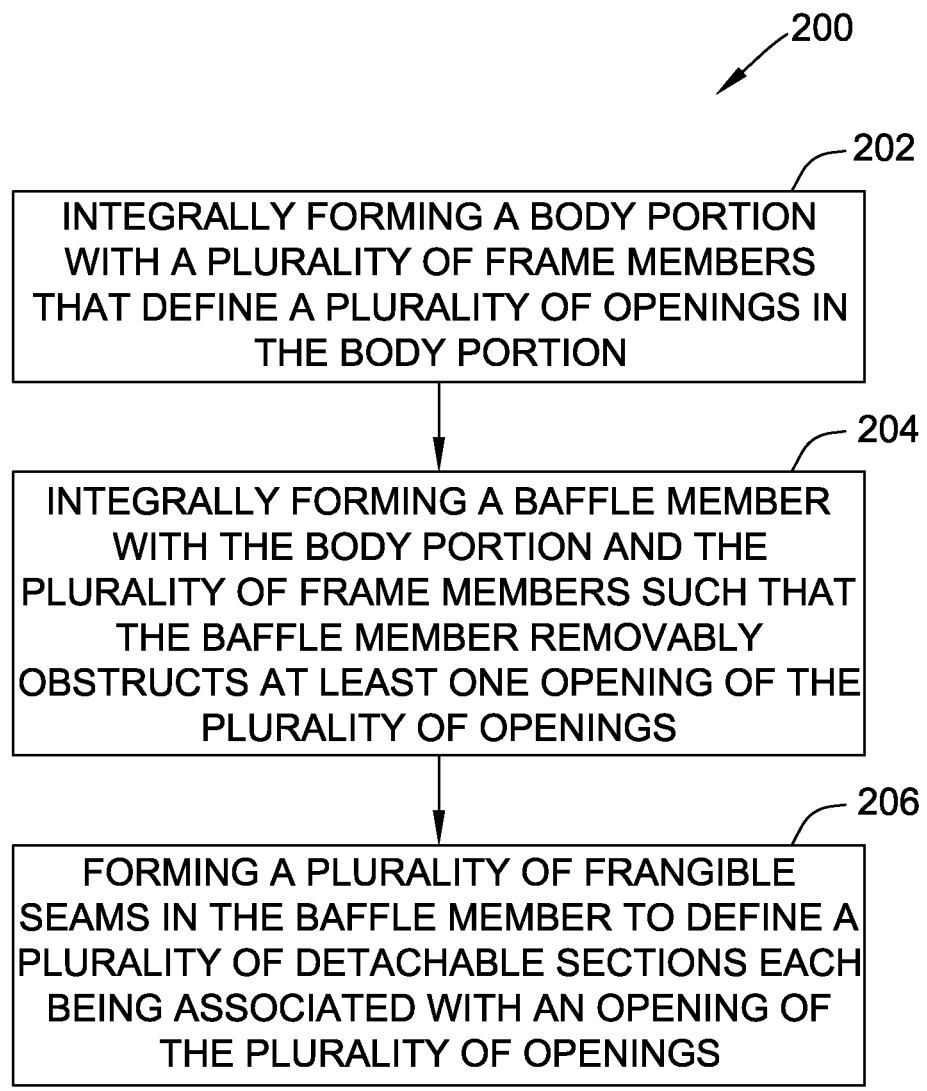
FIG. 7 is a flow chart of a method of manufacturing the decompression panel assembly shown in FIGS. 2-6.

FIG. 7 is a flow chart of a method 200 of manufacturing decompression panel assembly 106. Method 200 includes integrally forming 202 body portion 116 with plurality of frame members 118 such that frame members 118 define plurality of openings 120 in body portion 116. Method 200 also includes integrally forming 204 baffle member 122 with body portion 116 and plurality of frame members 118 such that baffle member 122 removably obstructs at least one opening 120 of plurality of openings 120. As described above, baffle member 122 is formed for at least partial displacement from openings 120 during a decompression event. Furthermore, method 200 includes forming 206 the plurality of frangible seams 124 in baffle member 122 to define plurality of detachable sections 126 such that each detachable section 126 is associated with an opening 120 of plurality of openings 120. Additionally, each of body portion 116, frame members 118, and baffle member 122 are integrally formed with panel member 114 to form a single-piece, unitary decompression panel assembly 106.

In the exemplary implementation baffle member 122, frame members 118, and body portion 116 are formed 202 from the same material. For example, baffle member 122, frame members 118, and body portion 116 are formed 202 from known lightweight thermoplastic materials such as, but not limited to, polycarbonate, polyphenylsulfone, and polyetherimide. Alternatively, baffle member 122, frame members 118, and body portion 116 are formed 202 from any material that facilitates operation of decompression panel assembly 106 as described herein. More specifically, baffle member 122, frame members 118, and body portion 116 are formed 202 from a lightweight noise attenuating material to decrease the noise level in cabin 100. Furthermore, baffle member 122, frame members 118, and body portion 116 are integrally formed 202 using injection molding or additive manufacturing (three-dimensional printing). Alternatively, baffle member 122, frame members 118, and body portion 116 are formed 202 using any fabrication method that facilitates operation of decompression panel assembly 106 as described herein.

In the exemplary implementation, frangible seams 124 are formed 206 simultaneously with baffle member 122, frame members 118, and body portion 116 such that frangible seams 124 are formed 206 during molding of decompression panel assembly 106. Alternatively, frangible seams 124 are formed 206 as a subsequent step to forming 202 of baffle member 122, frame members 118, and body portion 116. For example, frangible seams 124 are formed 206 using a post-molding step such as, but not limited to, machining or laser scoring. Additionally, frangible seams 124 may be formed 206 as a tapered or V-shaped notch, as shown in FIG. 6, or may be formed 206 as a plurality of perforations along baffle member 122. Furthermore, frangible seams 124 may be formed 206 as having a thinner cross-sectional area than surrounding portions of baffle member 122. Alternatively, frangible seams 124 are formed 206 using any fabrication method that facilitates operation of decompression panel assembly 106 as described herein.

Figure 8:
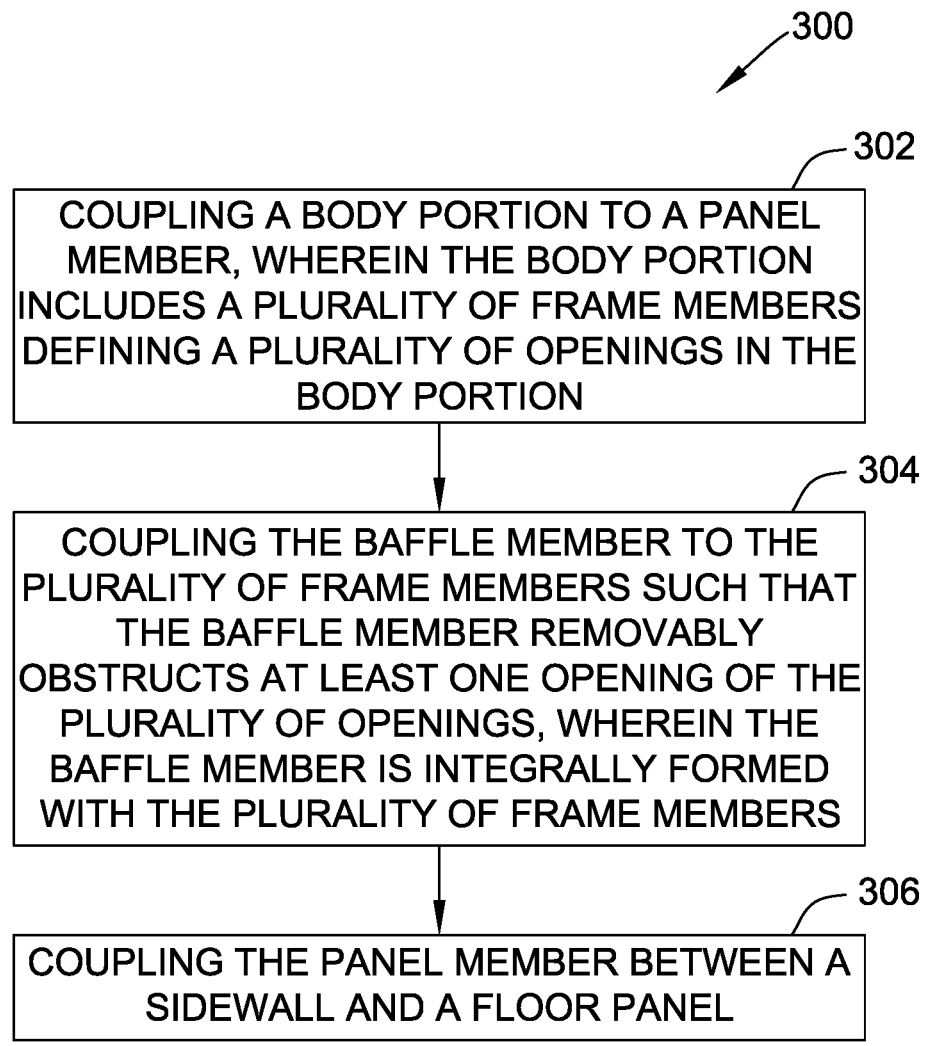
FIG. 8 is a flow chart of a method of installing the decompression panel assembly shown in FIGS. 2-6 in an aircraft.

FIG. 8 is a flow chart of a method 300 of installing decompression panel assembly 106 in aircraft 10. Method 300 includes coupling 302 body portion 116 to panel member 114. As described above, in the exemplary implementation, body portion 116 and panel member 114 are integrally formed and such coupling 302 is performed during initial fabrication of decompression panel assembly 106. Furthermore, method 300 includes coupling 304 baffle member 122 to frame member 118 of body portion 116 such that baffle member 122 removably obstructs at least one opening of the plurality of openings 120 formed by frame members 118. Again, as described above, in the exemplary implementation, baffle member 122, frame members 118, body portion 116, and panel member 114 are integrally formed and such coupling 304 of baffle member 122 to frame members 118 is performed during initial fabrication of decompression panel assembly 106. Finally, method 300 includes coupling 306 coupling panel member 114 between a sidewall 110 and a floor panel 104 of aircraft 10.

The embodiments described herein facilitate integrally forming a single-piece decompression panel assembly. The decompression panel assembly includes a body portion having frame members that define a plurality of openings and a baffle member integrally formed with the frame members such that the baffle member removably obstructs the openings. The baffle member also includes lines of weakness or frangible seams that yield during a decompression event such that the baffle member breaks away from the frame members, either as a single piece or as a plurality of detachable sections, to enable air to flow from the aircraft cabin through the openings in the decompression panel assembly.

As described herein, the integrally formed baffle member has a number of advantages over conventional separate baffles that are attached to a decompression panel with fasteners or adhesive. For example, the integrally formed baffle member described herein may result in less noise transmission in the cabin because the baffle is a solid member that is continuously attached to the frame members and may not allow for any undesired air to pass through or for flapping or resonating. Conventional baffles are only attached to the panel at a limited number of locations and are able to move where there is no attachment. Such movement allows air and sound to leak through. The integral baffle member described herein does not move, and so less noise is transmitted to the cabin. Similarly, the integral baffle member described herein facilitates reducing the weight of the decompression panel assembly. In order to reduce the movement described above, some convention baffles are relatively heavy. The integral baffle member described herein is a unitary piece with the remainder of the decompression panel assembly and is formed from the same lightweight material such that additional materials to reduce noise transmission are not required. Finally, the integral decompression panel and baffle described herein can simplify manufacturing and installation of the decompression panel assembly, which facilitates reducing costs.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A decompression panel assembly for use in an aircraft, said decompression panel assembly comprising:
   a body portion comprising a plurality of frame members defining a plurality of openings in said body portion;
   a baffle member integrally formed with said plurality of frame members, the baffle member comprising a plurality of detachable sections each associated with, and configured to removably obstruct, at least one opening of said plurality of openings, wherein said baffle member is configured for at least partial displacement from said at least one opening during a decompression event.

2. The decompression panel assembly in accordance with claim 1, wherein said baffle member comprises a plurality of frangible seams configured to yield during a decompression event.

3. The decompression panel assembly in accordance with claim 2, wherein said plurality of detachable sections are defined by said plurality of frangible seams.

4. The decompression panel assembly in accordance with claim 3, wherein said frangible seams form an entire perimeter of each detachable section such that each detachable section is detached from said plurality of frame members during a decompression event to enable air flow through said plurality of openings.

5. The decompression panel assembly in accordance with claim 3, wherein said frangible seams form only a portion of a perimeter of each detachable section such that each detachable section is hingedly coupled to said plurality of frame members during a decompression event to enable air flow through said plurality of openings.

6. The decompression panel assembly in accordance with claim 1, wherein said plurality of frame members comprise an inboard edge and an outboard edge, wherein said baffle member is integrally formed with said plurality of frame members proximate said outboard edge.

7. The decompression panel assembly in accordance with claim 1, wherein said baffle member obstructs each opening of said plurality of openings.

8. The decompression panel assembly in accordance with claim 1, wherein said baffle member obstructs fewer than all of said plurality of openings.

9. An aircraft comprising the decompression panel assembly in accordance with claim 1.

10. A method of manufacturing a decompression panel assembly for use in an aircraft, said method comprising:
forming a body portion with a plurality of frame members, wherein the plurality of frame members define a plurality of openings in the body portion;
integrally forming a baffle member with the body portion and the plurality of frame members such that the baffle member removably obstructs at least one opening of the plurality of openings, wherein the baffle member is configured for at least partial displacement from the at least one opening during a decompression event; and
forming a plurality of frangible seams in the baffle member to define a plurality of detachable sections each being associated with an opening of the plurality of openings, wherein the frangible seams are configured to yield in a decompression event.

11. The method in accordance with claim 10, further comprising forming the baffle member and the plurality of frame members from the same material.

12. The method in accordance with claim 10, wherein forming the body portion and forming the baffle member comprises forming the body portion and forming the baffle member via at least one of injection molding and additive manufacturing.

13. The method in accordance with claim 10, further comprising forming the frangible seams simultaneously with the baffle member.

14. The method in accordance with claim 10, further comprising forming the frangible seams after forming the baffle member.

15. The method in accordance with claim 10, wherein forming a plurality of frangible seams includes forming a plurality of frangible seams about an entire perimeter of each detachable section such that each detachable section is fully detached from the plurality of frame members during a decompression event to enable air flow through the plurality of openings.

16. The method in accordance with claim 10, wherein forming a plurality of frangible seams includes forming a plurality of frangible seams about only a portion of a perimeter of each detachable section such that each detachable section is hingedly coupled to the plurality of frame members during a decompression event to enable air flow through the plurality of openings.

17. A decompression panel assembly for use in an aircraft, said decompression panel assembly comprising:
a body portion comprising a plurality of frame members defining a plurality of openings in said body portion;
a baffle member integrally formed with said plurality of frame members such that said baffle member removably obstructs at least one opening of said plurality of openings, wherein said baffle member is configured for at least partial displacement from said at least one opening during a decompression event, wherein said baffle member comprises a plurality of frangible seams configured to yield during a decompression event.

18. The decompression panel assembly in accordance with claim 17, wherein said baffle member comprises a plurality of detachable sections defined by said plurality of frangible seams, wherein each detachable section is associated with an opening of said plurality of openings.

19. The decompression panel assembly in accordance with claim 18, wherein said frangible seams form an entire perimeter of each detachable section such that each detachable section is detached from said plurality of frame members during a decompression event to enable air flow through said plurality of openings.

20. The decompression panel assembly in accordance with claim 18, wherein said frangible seams form only a portion of a perimeter of each detachable section such that each detachable section is hingedly coupled to said plurality of frame members during a decompression event to enable air flow through said plurality of openings.

* * * * *